United States Patent
Graf

(10) Patent No.: US 6,200,426 B1
(45) Date of Patent: Mar. 13, 2001

(54) PAPER MACHINE WITH A CONTROLLABLE ELECTRO-MAGNETIC CLUTCH

(75) Inventor: Edwin X. Graf, Menasha, WI (US)

(73) Assignee: Voith Sulzer Paper Technology North America, Inc., Appleton, WI (US)

(*) Notice: Subject to any disclaimer, the term of this patent is extended or adjusted under 35 U.S.C. 154(b) by 0 days.

(21) Appl. No.: 09/268,161

(22) Filed: Mar. 12, 1999

(51) Int. Cl.[7] .............................. D21F 7/02; F16D 27/00
(52) U.S. Cl. ..................... 162/262; 162/265; 192/12 D; 192/84.21; 310/92; 310/103
(58) Field of Search ........................ 162/262, DIG. 10, 162/198, 265; 192/84.961, 84.941, 12 D, 84.21; 310/92–103, 78; 318/9

(56) References Cited

U.S. PATENT DOCUMENTS 4,449,617 * 5/1984 Sakakiyama et al. ............ 192/0.033
6,031,309 * 2/2000 Nishimura ............................ 310/92

* cited by examiner

Primary Examiner—Dean T. Nguyen
(74) Attorney, Agent, or Firm—Taylor & Aust, P.C.

(57) ABSTRACT

A paper-making machine or an off-line coater includes a rotatable drive unit and a rotatable driven element in the form of a roll, cylinder, pulley and/or gear. A clutch includes a rotatable input shaft coupled with the rotatable drive unit. At least one drive rotor is connected with the input shaft, and includes a plurality of magnetic coils. Each magnetic coil includes a coil winding. At least one driven rotor is positioned axially adjacent to at least one of the drive rotors. Each drive rotor includes a plurality of angularly spaced electrical conductors which are positioned adjacent to at least one of the drive rotors. A rotatable output shaft is coupled with the driven rotor and the rotatable driven element. A source of modulated direct current power is coupled with each of the magnetic coils, whereby a magnetic flux generated by the drive rotor and a coupling force between the drive rotor and the driven rotor can be varied.

21 Claims, 3 Drawing Sheets

PAPER MACHINE WITH A CONTROLLABLE ELECTRO-MAGNETIC CLUTCH

BACKGROUND OF THE INVENTION

1. Field of the Invention

The present invention relates to paper machines, and, more particularly, to couplings for transmitting rotational power to rolls, cylinders, pulleys and/or gears in paper machines.

2. Description of the Related Art

A paper machine such as a paper-making machine or off-line coater includes a plurality of rotatable driven elements, such as rolls, cylinders, pulleys and/or gears. Such rotatable driven elements are rotatably driven using a drive unit such as an electric motor, pump, etc. It is known to directly or indirectly connect the drive unit with a rotatable driven element using mechanical interconnections such as shafts, chains, belts, etc. It is also known to use a mechanically operated coupling such as a slip clutch with a plurality of pressure plates, etc. Such mechanical clutches have the disadvantage of wearing over time and thus requiring repair and/or replacement.

It is also known to use a magnetic coupling to interconnect a drive unit with a rotatable driven element in a paper machine. The magnetic coupling includes a first rotor carrying a plurality of permanent magnets and a second rotor carrying a plurality of electrical conductors. Rotation of the permanent magnets relative to the electrical conductors causes the generation of counter electro-magnetic fields which provide a rotatable output torque to drive the rotatable driven element. Such a magnetic coupling has the advantage of not wearing over time since the rotors do not physically wear against each other, when compared with a mechanical type clutch.

A disadvantage of a magnetic coupling as described above is that the permanent magnets have a substantially constant magnetic flux, which in turn results in a magnetic field with a substantially constant and finite strength. The efficiency of the magnetic coupling and transmitted torque can be only slightly varied within the operating range of the magnetic coupling.

What is needed in the art is a coupling or clutch which may be used to drive a rotatable driven element in a paper machine which allows the transmitting torque and/or efficiency of the clutch to be varied and controlled.

SUMMARY OF THE INVENTION

The present invention provides a controllable electro-magnetic clutch for providing controlled rotational speed and/or slip to rolls, cylinders, pulleys and/or gears in a paper machine.

The invention comprises, in one form thereof, a paper-making machine or an off-line coater including a rotatable drive unit and a rotatable driven element in the form of a roll, cylinder, pulley and/or gear. A clutch includes a rotatable input shaft coupled with the rotatable drive unit. At least one drive rotor is connected with the input shaft, and includes a plurality of magnetic coils. Each magnetic coil includes a coil winding. At least one driven rotor is positioned axially adjacent to at least one of the drive rotors. Each drive rotor includes a plurality of angularly spaced electrical conductors which are positioned adjacent to at least one of the drive rotors. A rotatable output shaft is coupled with the driven rotor and the rotatable driven element. A source of modulated direct current power is coupled with each of the magnetic coils, whereby a magnetic flux generated by the drive rotor and a coupling force between the drive rotor and the driven rotor can be varied.

An advantage of the present invention is that the coupling force between the rotatable drive unit and the roll, cylinder, pulley and/or gear can be varied.

Another advantage is that slip can be controlled in the coupling.

Yet another advantage is that the modulated direct current voltage to the magnetic coils can be provided in a number of simple and easily controllable ways.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
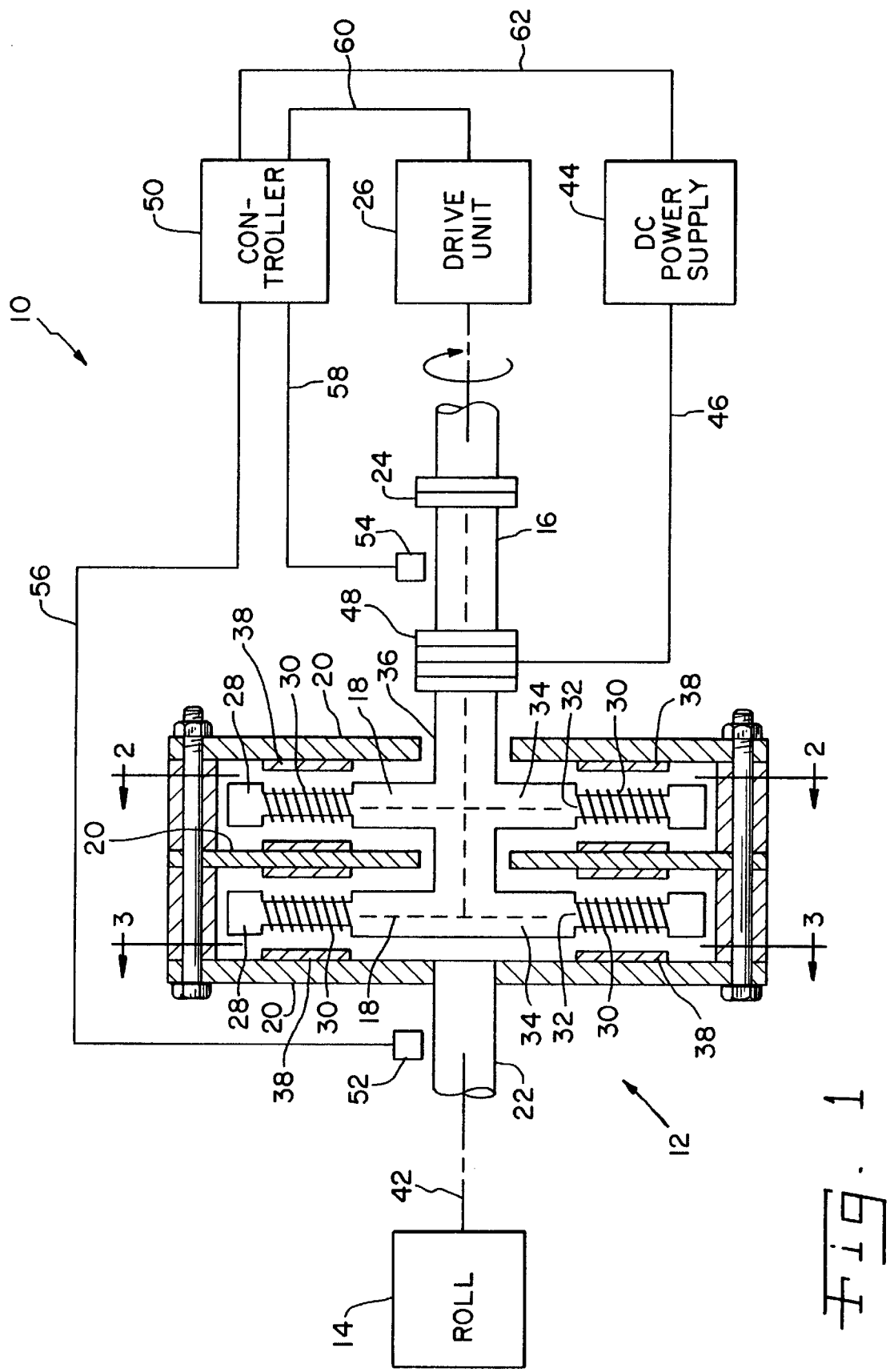
FIG. 1 is a side, partially sectioned view of a portion of a paper machine including an embodiment of an electro-magnetic clutch of the present invention.
Figure 2:
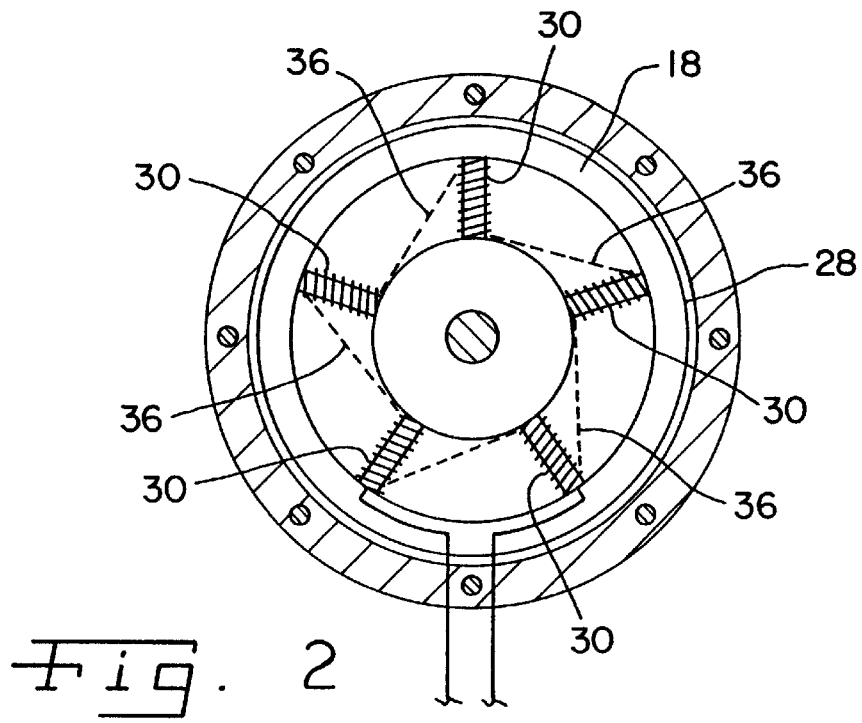
FIG. 2 is an end view of one of the drive rotors shown in FIG. 1.
Figure 3:
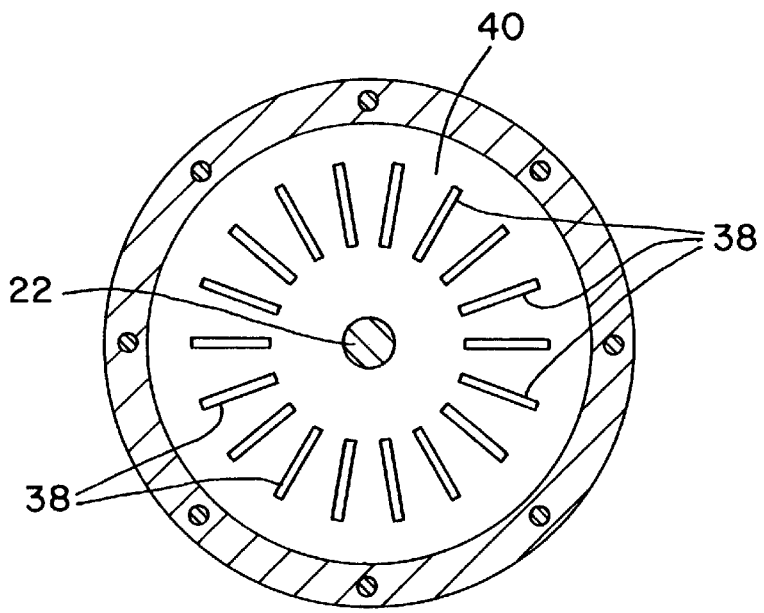
FIG. 3 is an end view of one of the driven rotors shown in FIG. 1.

Referring now to the drawings, and particularly to FIGS. 1 and 2, there is shown a paper machine 10 including an embodiment of a clutch 12 of the present invention. Paper machine 10 may be in the form of a paper-making machine or an off-line coater, and thus typically includes a plurality of rotatable driven elements such as a roll 14, cylinder (not shown), pulley (not shown) and/or gear (not shown). In the embodiment shown in FIGS. 1 and 2, paper machine 10 is assumed to be a paper-making machine with a wet end, forming section and dry end. The driven element is assumed to be a roll 14 which may be disposed anywhere along the length of paper-making machine 10.

Clutch 12 includes a rotatable input shaft 16, a pair of drive rotors 18, three driven rotors 20 and a rotatable output shaft 22. Input shaft 16 is coupled, such as through a flanged connection 24, with a rotatable drive unit 26, such as an electric motor. Input shaft 16 is rigidly attached to and carries each of drive rotors 18.

Each drive rotor 18 is disposed adjacent to and between a pair of driven rotors 20. Each drive rotor 18 includes a non-magnetic support disc 28 which carries a plurality of electro-magnetic coils 30. Support disc 28 may be formed from any suitable non-magnetic material, such as aluminum, brass or austenitic stainless steel. More particularly, disc 28 includes a plurality of radially extending arms 32 which connect with a hub 34. Each electro-magnetic coil 30 is wrapped around a respective arm 32. Electro-magnetic coils 30 may be connected with each other in a series or parallel circuit, depending upon the specific application with which clutch 12 is to be used. In the embodiment shown in FIG. 2, electro-magnetic coils 30 are connected with each other in a series circuit, represented by dashed lines 36. Additionally, in the embodiment shown, the individual electromagnetic coils 30 associated with each drive rotor 18 are connected in series, whereas the group of electro-magnetic coils 30 associated with each drive rotor 18 are connected in parallel as shown in FIG. 1. The number of electro-magnetic coils 30 carried by each drive rotor 18, as well as the specific configuration of each electro-magnetic coil (such as the wire diameter, turns ratio and/or material type) may also vary depending upon the specific application with which clutch 12 is used.

Driven rotors 20 are positioned axially adjacent to at least one of drive rotors 18. In the embodiment shown, one of driven rotors 20 is positioned between drive rotors 18, and the other two driven rotors 20 are positioned on opposite axial ends of drive rotors 18. Each driven rotor 20 includes a plurality of angularly spaced electrical conductors 38 which are positioned adjacent to at least one of drive rotors 18. Further, in the embodiment shown, disc 40 is formed from stainless steel. The number of electrical conductors 38 carried by disc 40 can of course vary. Moreover, the geometric configuration of each electrical conductor 38 may vary. In the embodiment shown in FIG. 1, each driven rotor 20 carries electrical conductors 38 which are disposed adjacent to one of drive rotors 18. However, it will also be appreciated that the driven rotor 20 which is disposed between drive rotors 18 may carry a plurality of electrical conductors 38 which extend axially through driven rotor 20. Configured as such, the electrical conductors 38 interposed between a pair of drive rotors 18 would be disposed adjacent to two drive rotors 18.

Output shaft 22 carries driven rotors 20 and allows driven rotors 20 to rotate relative to drive rotors 18 without contacting drive rotors 18. Output shaft 22 may be rotatably carried by suitable support structure (not shown). Output shaft 22 may either be directly or indirectly connected with the rotatable driven element such as roll 14, indicated by phantom line 42.

Electro-magnetic coils 30 are electrically connected with a source of modulated direct current (DC) power, such as DC power supply 44. More particularly, DC power supply 44 provides a modulated source of DC power over conductor 46 to slip rings 48 associated with input shaft 16. Slip rings 48 are in turn electrically connected with electric lines 36, which in turn are electrically connected with electro-magnetic coils 30. By varying the DC power which is supplied to electro-magnetic coils, the coupling force between drive rotors 18 and driven rotors 20 may also be varied. Thus, a predetermined amount of "slip" may be provided between input shaft 16 and output shaft 22.

Clutch 12 may also be provided with a control system including a controller 50, a first sensor 52 and a second sensor 54. First sensor 52 senses a rotational speed of output shaft 22 and provides an output signal indicative thereof to controller 50 via line 56. Likewise, second sensor 54 senses a rotational speed of input shaft 16 and provides an output signal indicative thereof to controller 50 via line 58. Controller 50 is also connected with and controls drive unit 26 and DC power supply 44 via lines 60 and 62 respectively. Controller 50 may use only the rotational output speed sensed by sensor 52 to control the operation of drive unit 26 and/or the coupling force associated with the DC power supply which is outputted from DC power supply 44. Alternatively, controller 50 may use the rotational speeds sensed by both first sensor 52 and second sensor 54 to determine a slip ratio between input shaft 16 and output shaft 22. The slip ratio is related to the coupling force associated with the DC power which is outputted from DC power supply 44. Thus, the slip ratio may be used to control the DC power which is outputted from DC power supply 44.

During use, drive unit 26 drives input shaft 16, which in turn rotatably drives drive rotors 18. DC power is supplied from DC power supply 44 through slip rings 48 and electro-magnetic coils 30. The magnetic flux generated by each electro-magnetic coil 30 causes the formation of an electromagnetic field which rotates with drive rotors 18. The rotating electro-magnetic field in turn causes a counter magnetic field to be generated within electrical conductors 38 of driven rotors 20. The magnetic field created by drive rotors 18, and the counter magnetic fields created with driven rotors 20, cause the formation of a coupling force between drive rotors 18 and driven rotors 20. The coupling force is translated into rotational movement of output shaft 22 which is used to directly or indirectly drive roll 14 of paper-making machine 10. The rotational speed of output shaft 22 and input shaft 16 are sensed using first sensor 52 and second sensor 54, respectively. Controller 50 receives the output signals from first-sensor 52 and second sensor 54 and controls the rotational speed of drive unit 26 and/or the DC power output from DC power supply 44, dependent upon the output signals received from first sensor 52 and/or second sensor 54.

Figure 4:
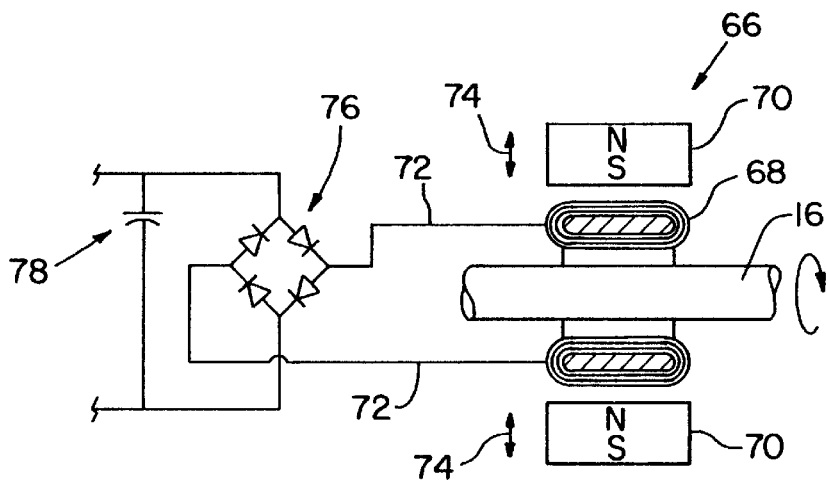
FIG. 4 is a partial, side view of another embodiment of a modulated direct current power source of the present invention.

Referring now to FIG. 4, there is shown another embodiment of a source of modulated direct current power 66 which may be used with clutch 12 of the present invention. Similar to slip rings 48 shown in FIG. 1, the source of modulated DC power 66 shown in FIG. 4 is also associated with input shaft 16. More particularly, an armature winding 68 is carried by input shaft 16. A plurality of permanent magnet 70 are carried by suitable support structure (not shown) and angularly spaced about the periphery of armature winding 68. Permanent magnet 70 are radially movable toward and away from armature winding 68 as indicated by directional arrow 74, thus varying the electrical current which is induced within armature winding 68 upon rotation of input shaft 16. The two electrical leads 72 associated with armature winding 68 are connected to a 4 diode, full wave rectifier which converts the alternating current (AC) power from armature winding 68 to DC power which is outputted over lines 36 to electro-magnetic coils 30. A capacitor 78 connected in parallel with rectifier 76 may also be used to eliminate "ripple" in the DC output from rectifier 76.

Figure 5:
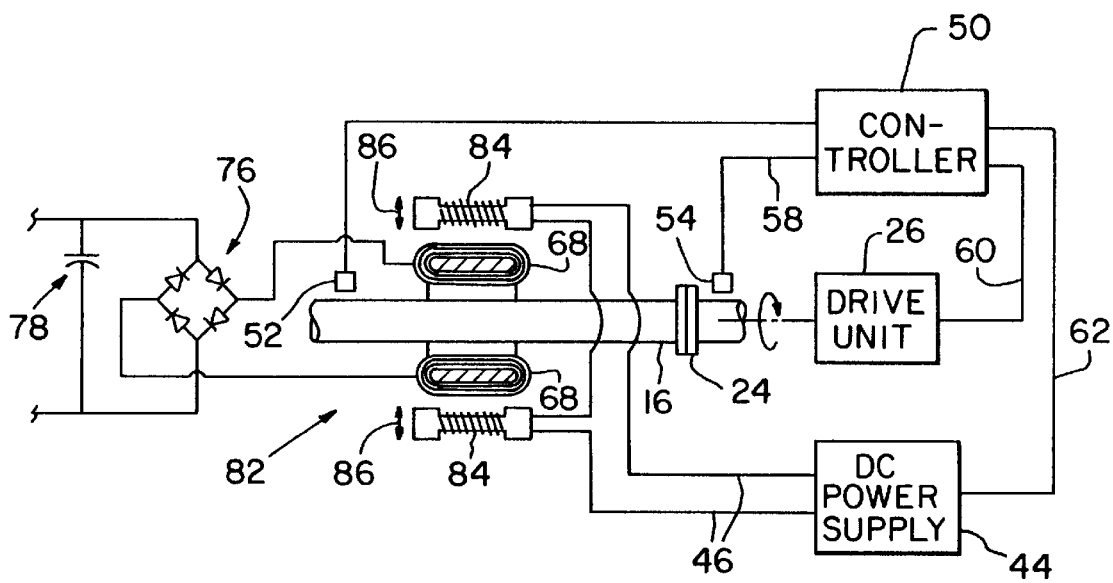
FIG. 5 is a partial, side view of yet another embodiment of a modulated direct current power source of the present invention.

Referring now to FIG. 5, another embodiment of a source of modulated direct current power 82 may be used with clutch 12 of the present invention is shown. The source of DC power 82 shown in FIG. 5 includes an armature winding 68, rectifier 76 and capacitor 78, similar to the embodiment shown in FIG. 4. However, the source of direct current power 82 shown in FIG. 5 includes a plurality of primary coils 84 which are disposed radially adjacent to armature winding 68 and movable in a radial direction toward and away from armature winding 68 as indicated by directional arrows 86. Primary coils 84 receive modulated DC power from DC power supply 44 over electrical conductors 46. By modulating the DC power which is outputted from DC power supply 44 and/or the radial clearance distance between primary coils 84 and armature winding 68, the electrical current which is induced into armature winding 68 can be varied. Controller 50, first sensor 52 and second sensor 54 can favorably be used to control the rotational speed of output shaft 22 and/or the slip ratio between input shaft 16 and output shaft 22, as described above with reference to FIG. 1.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A paper machine including at least one of a paper-making machine and an off-line coater, said paper machine comprising:
    a rotatable drive unit;
    a rotatable driven element comprising one of a roll, cylinder, pulley and gear;
    a clutch including:
        a rotatable input shaft coupled with said rotatable drive unit;
        at least one drive rotor connected with said input shaft, said drive rotor including a plurality of magnetic coils, each said magnetic coil including a coil winding;
        at least one driven rotor positioned axially adjacent to at least one of said drive rotors, each said driven rotor including a plurality of angularly spaced electrical conductors, each said electrical conductor positioned adjacent to at least one of said drive rotors;
        a rotatable output shaft coupled with said driven rotor and said rotatable driven element; and
        a source of modulated direct current power coupled with each of said magnetic coils, whereby a magnetic flux generated by said drive rotor and a coupling force between said drive rotor and said driven rotor can be varied.

2. The paper machine of claim 1, wherein said source of modulated direct current power comprises a direct current power supply with a controllable output.

3. The paper machine of claim 2, further comprising slip rings associated with said input shaft and interposed between said source of direct current power and said plurality of magnetic coils.

4. The paper machine of claim 1, wherein said source of modulated direct current power comprises at least one armature winding carried by said input shaft, and a plurality of permanent magnets disposed radially adjacent to said at least one armature winding.

5. The paper machine of claim 4, wherein said source of modulated direct current power further comprises a rectifier disposed between said at least one armature winding and said plurality of magnetic coils.

6. The paper machine of claim 5, wherein said source of direct current power further comprises a capacitor disposed between said rectifier and said plurality of magnetic coils.

7. The paper machine of claim 4, wherein said permanent magnets are radially movable toward and away from said input shaft, thereby modulating electrical current induced in said at least one armature winding.

8. The paper machine of claim 1, wherein said source of modulated direct current power comprises at least one armature winding carried by said input shaft, at least one primary coil disposed radially adjacent to said at least one armature winding, and a direct current power supply coupled with said at least one primary coil.

9. The paper machine of claim 8, wherein said direct current power supply provides modulated direct current power to said at least one primary coil.

10. The paper machine of claim 8, wherein each said primary coil is radially movable toward and away from said input shaft, thereby modulating electrical current induced in said at least one armature winding.

11. The paper machine of claim 8, wherein said source of modulated direct current power further comprises a rectifier disposed between said at least one armature winding and said plurality of magnetic coils.

12. The paper machine of claim 11, wherein said source of modulated direct current power further comprises a capacitor disposed between said rectifier and said plurality of magnetic coils.

13. The paper machine of claim 1, further comprising a first sensor associated with said output shaft for sensing a rotational speed of said output shaft and providing a first signal, and an electrical controller connected with each of said rotatable drive unit and said first sensor, said controller controlling an output speed of said rotatable drive unit dependent upon said first signal.

14. The paper machine of claim 13, further comprising a second sensor associated with said input shaft for sensing a rotational speed of said input shaft and providing a second signal, said electrical controller connected with said second sensor and determining a slip ratio between said input shaft and said output shaft dependent upon said first signal and said second signal.

15. The paper machine of claim 1, further comprising a first sensor associated with said output shaft for sensing a rotational speed of said output shaft and providing a first signal, and an electrical controller connected with said first sensor and at least one of said rotatable drive unit and said source of modulated direct current power.

16. The paper machine of claim 1, wherein each said drive rotor is positioned axially adjacent to two of said driven rotors.

17. The paper machine of claim 1, wherein each said coil winding is connected with said source of direct current power in one of a series and parallel circuit.

18. The paper machine of claim 1, wherein said plurality of magnetic coils are angularly spaced relative to each other around a periphery of said drive rotor.

19. The paper machine of claim 1, wherein each said electrical conductor is positioned adjacent to one of said drive rotors.

20. The paper machine of claim 19, wherein said driven rotor comprises a steel disk and said plurality of electrical conductors comprise a plurality of copper plates carried by said disk.

21. The paper machine of claim 1, wherein said paper machine comprises a paper-making machine with a wet end, a forming section and a dry end.

* * * * *